Figure 1:
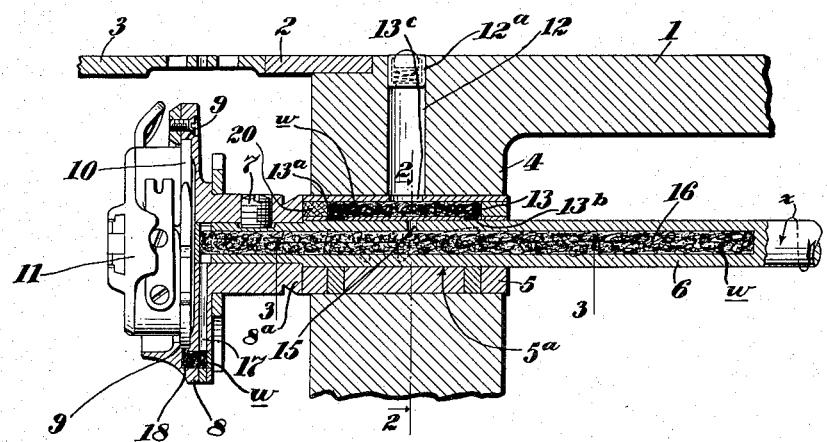

Dec. 28, 1937. G. A. FLECKENSTEIN ET AL 2,103,899

LUBRICATING DEVICE FOR SEWING MACHINES

Filed Nov. 1, 1935

Witness:
John N. Cave

Inventors
George A. Fleckenstein
and
Max L. Waterman

By Henry Miller
Attorney

Patented Dec. 28, 1937

2,103,899

UNITED STATES PATENT OFFICE 2,103,899

LUBRICATING DEVICE FOR SEWING MACHINES

George A. Fleckenstein, Stratford, and Max L. Waterman, Fairfield, Conn., assignors to The Singer Manufacturing Company, Elizabeth, N. J., a corporation of New Jersey Application November 1, 1935, Serial No. 47,766

10 Claims. (Cl. 112—256)

This invention relates to sewing machines and it has as its primary object to overcome certain difficulties heretofore experienced in the lubrication of one or more bearings thereof.

More specifically stated, this invention has among its objects to provide improved means for continuously lubricating the bobbin-carrier raceway and the forward bearing of the rotary loop-take shaft and for preventing the lubricant from escaping from the ends of the shaft bearing.

It has heretofore been found most expedient to lubricate both the loop-taker shaft bearing and the bobbin-carrier raceway from a single lubricating device, such, for example, as that shown in United States Patent to Waterman and Fleckenstein, No. 1,689,310, Oct. 20, 1928.

While devices of this nature have effectively lubricated the shaft bearing and bobbin-carrier raceway in sewing machines which are operated at slow speed or on relatively short runs, they have not been entirely satisfactory in machines which are operated at high speed on long runs and which therefore are stopped more or less infrequently.

It has been found that this is due to the fact that at high speed rotation of the loop-taker shaft centrifugal force overcomes the natural tendency of the oil to flow by gravity and capillary attraction from the supply to the bobbin-carrier raceway. Therefore in devices such as shown in the above mentioned patent, oil has been permitted to enter the bore in the loop-taker shaft only when the machine is running at slow speed or when it is brought to rest with the various oil inlet ducts in alignment. Inasmuch as the ducts are necessarily small it will be obvious that such alignment will result only in a small percentage of the stops made. This has resulted in insufficient lubrication of the bobbin-carrier raceway.

Furthermore, constructions of this nature did not provide any means to prevent the lubricant from escaping from the ends of the shaft bearing, with the result that the supply was rapidly depleted, the lubricant was lost and the machine was unduly soiled. The only solution of this problem which heretofore was suggested was the employment of packing glands about the shaft, but inasmuch as such glands produce a considerable amount of friction it is obvious that their elimination is highly desirable.

The present invention has effectively overcome these difficulties by providing lubricating means which continuously and positively supplies a proper amount of lubricant to the shaft bearing, and to the bobbin-carrier raceway, during operation of the machine and precludes the escape of lubricant from the ends of the shaft bearing without the employment of friction-producing devices. This has been accomplished by supplying lubricant to the end portions of the shaft bearing and forming a plurality of oppositely inclined grooves in the shaft within the bearing, the grooves diverging in the direction of rotation of the shaft whereby, during rotation of the shaft, they collect the lubricant from the end portions of the shaft bearing and feed it along the surface of the bearing toward the central portion thereof. This continuous transportation of the lubricant from the end portions of the bearing toward the center thereof lubricates the entire bearing and also precludes the escape of oil from the open ends thereof. One of the inclined grooves connects, at its inner end, with a radial duct in the shaft and serves to force lubricant therein during operation of the machine. This radial duct is connected with the bobbin-case raceway by suitable conduits formed in the shaft and in the rotary loop-taker. If desired, these conduits may be filled with wicking to retard and control the flow of lubricant to the raceway.

With the above and other objects in view, as will hereinafter appear, the invention comprises the devices, combinations and arrangement of parts hereinafter described and claimed.

The several features of the invention, and the advantages attained thereby will be readily understood from the following description in conjunction with the drawing which has been annexed as a part of this disclosure and which depicts a preferred embodiment of the invention.

Figure 2:
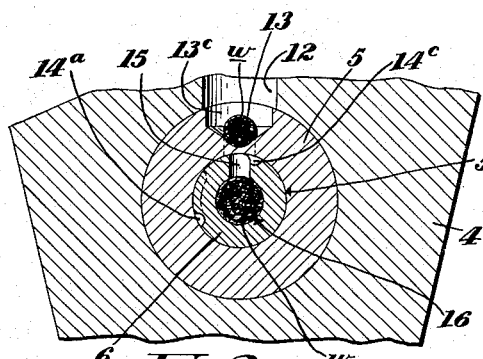
Figure 3:
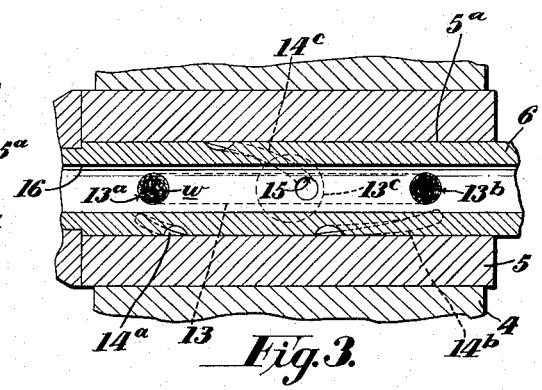
Figure 4:
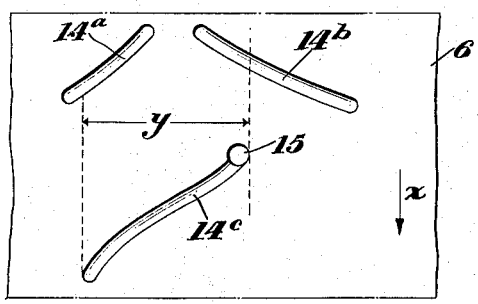

In the accompanying drawing, Fig. 1 is a vertical sectional view representing a portion of a sewing machine showing the improved lubricating means incorporated therein. Fig. 2 represents an enlarged transverse sectional view on the line 2—2 of Fig. 1. Fig. 3 represents an enlarged longitudinal sectional view on the line 3—3 of Fig. 1. Fig. 4 represents a development of a portion of the loop-taker shaft illustrating the location and arrangement of the various inclined oil grooves therein.

Referring more specifically to the drawing, the invention is disclosed as embodied in a sewing machine comprising a bed-plate 1, cover-plate 2, throat-plate 3 and a bearing lug 4 formed integral with the bed-plate. Within a bore 5ª, formed in a bushing 5 fixed in the bearing lug 4, is journaled a rotary loop-taker shaft 6, to the forward end of which is secured, as by screw 7, a loop-taker 8. This loop-taker is provided with an annular raceway 9 within which is journaled the annular flange 10 of a stationary bobbin-carrier 11.

Inasmuch as the other elements of the sewing machine may be conventional, illustration and description thereof is deemed unnecessary.

The bearing lug 4 is formed with a chamber 12 which serves as a reservoir for oil to lubricate the shaft bearing and the bobbin-carrier raceway. This chamber may be closed at its upper end by any suitable means, such for example as a ball valve 12a. The bushing 5 is provided with an oil-distributing conduit 13 which extends parallel with the bore 5a and is connected therewith, adjacent the ends of the bushing, by outlet ducts 13a, 13b. An inlet duct 13c, formed in the bushing 5, intermediate the two outlet ducts, serves to admit lubricant from the reservoir 12 to the conduit 13. Preferably the conduit 13 and, if desired, the ducts 13a, 13b are filled with wicking w to somewhat retard the flow of lubricant therethrough.

Wicking in the bore 13 serves the dual function of metering the lubricant to the shaft bearing during the running of the machine, and of preventing leakage of the oil while the machine is at rest.

The bore 13 is closed at its forward end by a wooden plug 20 which is sufficiently porous to permit a slight seepage of oil therethrough to lubricate the end wall of the hub 8a of the loop-taker where it abuts a thrust-bearing constituting the forward end of the bushing 5.

From the foregoing it will be understood that, during the running of the machine, lubricant from the reservoir is continuously transmitted to the bearing bore 5a adjacent the ends of the bushing 5 to lubricate the shaft bearing. It is to be noted that the shaft bearing is devoid of all friction-producing devices, such for example as packing glands, to prevent escape of lubricant from the free ends of the bearing. Friction-free means, however, is provided for this purpose. This means comprises a plurality of oppositely inclined grooves 14a, 14b and 14c formed in that portion of the shaft 6 within the bearing bushing. These grooves diverge in the direction of rotation of the shaft (indicated by the arrows x) and therefore, during such rotation, pick up oil adjacent the ends of the bearings and impel it inwardly toward the central portion of the bearing, thus lubricating the entire bearing surface and preventing the oil from escaping from the ends of the bearing.

It has been found that in prior constructions, there is a greater tendency for the lubricant to escape from the front end of the loop-taker shaft bearing than from the rear end thereof. Therefore, the groove 14a has been provided as additional means to withdraw the lubricant from the front end of the bearing.

The inner end of the groove 14c terminates in a radial inlet duct 15 formed in the shaft 6. This duct communicates with an axial bore 16, formed in said shaft, and delivers thereto, by pump action, lubricant which is picked up from said bearing by the groove 14c during the rotation of the shaft.

As shown at y, in Fig. 4, the path of rotation of the groove 14c overlaps the paths of rotation of the grooves 14a and 14b, thus insuring that the groove 14c will pick up the lubricant transmitted inwardly by the other two grooves and force it into the duct 15.

The lubricant which enters the inlet duct 15 flows through the bore 16 in the loop-taker shaft and is transmitted by a radial duct 17 in the loop-taker to a longitudinal duct 18 therein. This latter duct connects with the bobbin-carrier raceway 9 and supplies it with the required amount of lubricant. Preferably the bore 16 and one or more of the ducts in the loop-taker are filled with wicking w to control and regulate the flow of lubricant to the raceway.

From the foregoing, it will be perceived that this invention has provided means for continuously supplying to both the shaft bearing and the bobbin-carrier raceway the required amount of lubricant and also has provided, in combination therewith, friction-free means, rendered effective by the rotation of the shaft, for preventing the lubricant from escaping from the open ends of the shaft bearing.

It is apparent that similar results may be obtained by forming the inclined grooves in the shaft bearing instead of in the shaft and it is to be understood that this invention contemplates this obvious reversal.

Having thus set forth the nature of the invention what we claim herein is:

1. In a sewing machine, a bed-plate provided with a bearing; a lubricant reservoir supported thereby; a loop-taker shaft rotatably journaled in said bearing; a loop-taker actuated by said shaft and provided with a raceway; means to supply lubricant to said bearing adjacent the ends thereof, said shaft being provided, in its surface within said bearing, with a plurality of oppositely inclined grooves which diverge in the direction of rotation of said shaft and serve to transmit lubricant from the ends of said bearing to the central portion thereof; and means to conduct lubricant from the central portion of said bearing to said loop-taker raceway.

2. In a sewing machine; a rotating shaft having an axial bore and a radial duct connecting therewith; a bearing in which said shaft is journaled; a loop-taker secured to said shaft and having a bearing surface and a lubricant conduit connecting said surface with said bore; means to supply lubricant to the effective surface of said bearing adjacent its ends; and means, rendered effective by the rotation of said shaft, including oppositely inclined grooves formed in one of the meeting surfaces of said shaft and bearing, to pick up lubricant from adjacent the ends of said bearing surface and to transmit it inwardly from the ends of said bearing, one of said grooves being connected with said radial duct and conveying lubricant thereto for transmission to said loop-taker.

3. In a sewing machine, a rotating shaft having an axial bore and a radial duct connected therewith; a bearing in which said shaft is journaled; a second bearing, remote from the first named bearing, with which said bore is connected, means to supply lubricant to the effective surface of said bearing adjacent its ends; and means, rendered effective by the rotation of said shaft, including two oppositely inclined grooves formed in said shaft, to pick up lubricant from adjacent the ends of said bearing surface and to transport it to adjacent the center thereof; and a third inclined groove in said shaft adapted to pick up the lubricant transported inwardly by said two grooves and to transmit it to said radial duct and therethrough into said axial bore for transmission to said second bearing.

4. In a sewing machine, a frame; a shaft bearing supported thereby; a second bearing remote from said shaft bearing, a loop-taker shaft rotatably journaled in said first bearing and provided with an axial bore connected with said second bearing, a radial duct connected with said axial bore and a plurality of oppositely inclined grooves which diverge in the direction of rotation of said shaft, one of said grooves being connected with said radial duct and serving to direct lubricant thereto for transmission through said bore to said second bearing; and means to supply lubricant to the opposite end portions of said bearing.

5. In a sewing machine, a cloth-plate; a loop-taker actuating shaft located beneath said cloth-plate and provided with an axial bore and a radial inlet duct connected with said bore; a bearing in which said shaft is journaled; a loop-taker secured to said shaft and having a radial duct connected with said bore; a bobbin-carrier journaled in a raceway in said loop-taker; a longitudinal duct in said loop-taker connecting said radial duct with said raceway; means for supplying lubricant to said shaft bearing and therefrom, through said inlet duct, axial bore, radial duct and longitudinal duct, to said bobbin-carrier raceway; and means rendered effective by the rotation of said shaft to prevent the lubricant from escaping from the ends of said bearing.

6. In a sewing machine, a cloth-plate; a loop-taker actuating shaft located beneath said cloth-plate and provided with an axial bore and a radial inlet duct connected with said bore; a bearing in which said shaft is journaled; a loop-taker secured to said shaft and having a radial duct connected with said bore; a bobbin-carrier journaled in a raceway in said loop-taker; a longitudinal duct in said loop-taker connecting said radial duct with said raceway; means for supplying lubricant to said shaft bearing and therefrom, through said inlet duct, axial bore, radial duct and longitudinal duct, to said bobbin-carrier raceway; and means including a plurality of oppositely inclined grooves formed in said shaft within said bearing to convey the lubricant from the ends of said bearing to the central portion thereof.

7. In a sewing machine, a cloth-plate; a loop-taker actuating shaft located beneath said cloth-plate and provided with an axial bore and a radial inlet duct connected with said bore; a bearing in which said shaft is journaled; a loop-taker secured to said shaft and having a radial duct connected with said bore; a bobbin-carrier journaled in a raceway in said loop-taker; a longitudinal duct in said loop-taker connecting said radial duct with said raceway; means for supplying lubricant to said shaft bearing and therefrom, through said inlet duct, axial bore, radial duct and longitudinal duct to said bobbin-carrier raceway; and means comprising a plurality of inclined grooves in said shaft within said bearing to impel lubricant from the ends of said bearing to the central portion thereof.

8. In a sewing machine having a frame; a bearing supported thereby; a shaft rotatably journaled in said bearing and provided with an axial bore and a radial inlet duct connected therewith; lubricant receiving means connected with said axial bore; means to supply lubricant to said bearing adjacent the ends thereof; and means rendered effective by the rotation of said shaft to impel the lubricant from the ends of said bearing to the central portion thereof from which it passes through said inlet duct and axial bore in said shaft to said lubricant receiving means.

9. In a sewing machine, a rotating shaft having an axial bore and a radial duct connecting therewith; a bearing in which the portion of the shaft having said duct is journaled; a loop-taker secured to said shaft and having a bearing surface and a lubricant conduit connecting said surface with said bore; means to supply lubricant to the effective surface of said shaft bearing; and means effective during rotation of said shaft for picking up lubricant from said bearing and forcibly injecting it into said radial duct, in oposition to centrifugal force, for transmission through said duct and axial bore to said loop-taker bearing.

10. In a lock-stitch sewing machine, a rotary loop-taker having a bobbin-carrier raceway, a rotary loop-taker shaft provided with a longitudinal lubricant-conducting bore connected with said raceway, a lubricant-supply reservoir, and lubricant-impelling means on said shaft for delivering lubricant from said supply reservoir into said shaft bore.

GEORGE A. FLECKENSTEIN.
MAX L. WATERMAN.